United States Patent [19]
Rajagopalan et al.

[11] Patent Number: 6,103,787
[45] Date of Patent: Aug. 15, 2000

[54] GOLF BALL COVER COMPOSITIONS

[75] Inventors: Murali Rajagopalan, South Dartmouth; Kevin Harris, New Bedford; Padraic W. Elliott, East Freetown; Christopher E. Charleston, Buzzards Bay, all of Mass.

[73] Assignee: Acushnet Company, Fairhaven, Mass.

[21] Appl. No.: 09/033,737

[22] Filed: Mar. 3, 1998

[51] Int. Cl.$^7$ .................................................. A63B 37/12
[52] U.S. Cl. ..................... 523/351; 524/522; 525/221; 473/378; 473/385
[58] Field of Search .......................... 523/351; 473/378, 473/385; 524/522; 525/221

[56] References Cited

U.S. PATENT DOCUMENTS

| | | |
|---|---|---|
| 3,264,272 | 8/1966 | Rees . |
| 4,679,794 | 7/1987 | Yamada et al. . |
| 4,798,386 | 1/1989 | Berard . |
| 4,802,674 | 2/1989 | Kitaoh . |
| 4,865,326 | 9/1989 | Isaac et al. . |
| 4,871,589 | 10/1989 | Kitaoh et al. . |
| 4,911,451 | 3/1990 | Sullivan . |
| 5,000,458 | 3/1991 | Proudfit . |
| 5,000,459 | 3/1991 | Isaac . |
| 5,029,870 | 7/1991 | Concepcion et al. . |
| 5,156,405 | 10/1992 | Kitaoh et al. . |
| 5,300,325 | 4/1994 | Nealon et al. . |
| 5,328,959 | 7/1994 | Sullivan . |
| 5,334,673 | 8/1994 | Wu . |
| 5,848,942 | 12/1998 | Kato . |

FOREIGN PATENT DOCUMENTS

| | | |
|---|---|---|
| 2122506 | 11/1994 | Canada . |
| 0 039 588 A2 | 11/1981 | European Pat. Off. . |
| 2260546 | 4/1993 | United Kingdom . |
| WO 92/19656 | 11/1992 | WIPO . |

*Primary Examiner*—David Buttner
*Attorney, Agent, or Firm*—Pennie & Edmonds LLP

[57] ABSTRACT

The present invention is directed to golf balls comprising a cover and a core, wherein the cover is formed from a blend which comprises a base ionomer resin and a color concentrate comprising a coloring agent and a carrier ionomer resin. The relationship between the acid content of the base ionomer resin (X), wherein (X) is at least about 15% by weight and the acid content of the carrier ionomer resin (Y) is X−Y≦4. Golf balls made with covers having base ionomer resins and carrier ionomer resins meeting the above relationship exhibit superior durability characteristics, including a significant reduction flow front failures and delamination as compared to golf ball covers which do not meet the above relationship.

20 Claims, No Drawings

6,103,787

GOLF BALL COVER COMPOSITIONS

FIELD OF INVENTION

The present invention is directed to golf balls comprising a cover and a core, wherein the cover is formed from a blend which comprises a base ionomer resin and a color concentrate, wherein the color concentrate comprises a coloring agent and a carrier ionomer resin.

BACKGROUND OF THE INVENTION

For the last two decades, resin materials known as ionomers have been used extensively as cover stock materials for golf balls. Over the years, it has been found that such ionomers can be used to form very durable covers for golf balls, while also providing acceptable in-play characteristics such as spin rate, feel and initial velocity.

These resins are well known and are commercially available under a variety of tradenames such as SURLYN® (DuPont) and IOTEK® (Exxon). Presently, there are more than 50 grades of ionomers commercially available having a wide range of properties which vary according to a variety of parameters such as the type and amount of metal cations, molecular weight and composition of the base resin (e.g. the relative content of ethylene and methacrylic and/or acrylic acid groups).

Generally speaking, ionomers are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0–50 (preferably 0–25, most preferably 0–20), weight percent of the polymer, and Y is acrylic or methacrylic acid present in 5–35 (preferably 10–35, more preferably at least about 16–35, most preferably at least about 16–20) weight percent of the polymer, wherein the acid moiety is neutralized 1–90% (preferably at least 40%, most preferably at least about 60%) to form an ionomer by a cation such as lithium, sodium, potassium, magnesium, calcium, barium, lead, tin, zinc or aluminum, or a combination of such cations. Specific acid-containing ethylene copolymers include ethylene/ acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/ methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/ methacrylic acid, ethylene/acrylic acid, ethylene/ methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/ (meth)acrylic acid/n-butyl acrylate, ethylene/(meth)acrylic acid/ethyl acrylate, and ethylene/(meth)acrylic acid/methyl acrylate copolymers.

The manner in which the ionomers are made is well known in the art and is described in a variety of references, including, e.g., U.S. Pat. No. 3,262,272.

Ionomers are generally colorless compounds and therefore it is necessary to add materials such as coloring agents in order to impart a suitable color to a golf ball cover composition formed from an ionomer blend. Suitable coloring agents include pigments such as titanium dioxide ($TiO_2$), Zinc Oxide (ZnO) and Calcium Oxide (CaO), with $TiO_2$ generally being a preferred material.

In order to achieve uniform color in the cover composition, it is important that the coloring agent be thoroughly mixed and well dispersed throughout the base ionomer resin. However, such dispersion is not easily achieved, as coloring agents, especially those having a relatively small particle size such as $TiO_2$, do not readily disperse throughout large batches of the base ionomer resin.

One conventional method of obtaining an acceptable dispersion of coloring agent throughout the base ionomer resin is to form a color concentrate containing a coloring agent and admixing the color concentrate with the base ionomer resin blend. The color concentrate is formed by mixing the coloring agent with a carrier ionomer resin. Any conventional mixing method may be employed to form the color concentrate. A preferred method is mixing the coloring agent and the carrier ionomer resin in a twin screw extruder and pelletizing the resulting extrudate, thereby forming pellets of the color concentrate composition.

The color concentrate pellets are subsequently admixed with pellets of the base ionomer resin, typically in an injection molding machine to form a cover blend for forming a golf ball cover. The cover blend comprises about 99 to about 90% by weight base ionomer resin and about 1 to about 10% by weight color concentrate; preferably about 98 to about 93% by weight base ionomer resin and about 2 to about 7% by weight color concentrate and most preferably about 96 to about 95% by weight base ionomer resin and about 4 to about 5% by weight color concentrate. Unless otherwise noted, "% by weight" as used herein refers to the percentage by total weight of the cover layer blend.

Additional components conventionally added to cover compositions include ultraviolet light stabilizers and/or absorbers, optical brighteners, fluorescent pigments, dyes, processing aids and fillers. The total amount of such additional components is typically about 1 to about 10% by weight, preferably about 2 to about 8% by weight, and more preferably about 5% by weight.

However, golf balls having covers formed from a blend of base ionomer resin and a color concentrate formed from a carrier ionomer resin and a coloring agent have, on occasion, been observed to exhibit delamination of the cover layer and/or an increased occurrence in cover failure along the seam of the cover. Delamination and seam failure are generally recognized in the golf ball art to be indicative of incomplete mixing and/or incompatibility of the components of the cover compositions.

Therefore, there exists a need for a method of making golf ball cover blends, as well as covers made from such blends, which avoid or prevent the occurrence of cover layer delamination and/or the occurrence of seam failures, thereby increasing the durability of the golf ball cover and extending the useful life of the golf ball.

SUMMARY OF THE INVENTION

The present invention is directed to a golf ball comprising a cover and a core, wherein the cover is formed from a blend which comprises a base ionomer resin and a color concentrate comprising a coloring agent and a carrier ionomer resin, wherein the acid content of the base ionomer resin and the acid content of the carrier ionomer resin have both been selected so as to avoid or prevent delamination and/or the occurrence of seam failures in the golf ball cover.

In particular, the present invention is directed to golf balls comprising a cover and a core, wherein the cover blend comprises a base ionomer resin and a color concentrate comprising a coloring agent and a carrier ionomer resin, wherein the relationship of the acid content by weight percent of the base ionomer resin (X), wherein X is at least about 15% by weight and the acid content of the carrier ionomer resin (Y) is X–Y≦4.

The present invention is yet further directed to golf balls comprising a cover and a core, wherein the cover blend comprises a base ionomer resin and a color concentrate comprising a coloring agent and a carrier ionomer resin, wherein the acid content by weight percent of the base ionomer resin (X), wherein X is at least about 15% by weight and the acid content of the carrier ionomer resin (Y) are substantially the same.

DETAILED DESCRIPTION OF THE INVENTION

Golf ball covers typically exhibit one of two types of failures: 1) "random" failures; or 2) "flow front" failures. As used herein, "random failures" refers to flaws such as cuts, cracks or other fractures which appear in the outer surface of the cover of a golf ball after it is struck with a club. Random failures may appear anywhere in the cover and are either the result of a random defect in the cover or occur towards the end of the useful life of the golf ball cover. Although the durability of ionomer resin golf ball covers varies depending upon the particular composition of the cover blend, conventional golf balls having ionomer resin covers (cover hardness 65–70 Shore D) typically can be expected to have a useful life of at least 300 hits by a golf club before a random failure occurs.

As used herein, "flow front" refers to defects such as cracks, fractures or other surface defects which appear along areas where the ionomer cover blend flows together during the formation of the golf ball cover. For example, when ionomer golf ball covers are formed by compression molding hemispherical cups formed from an ionomer resin blend around a core to form the spherical cover, a parting line is formed along the equator of the ball where the ionomer material of the hemispherical cups flows together. The parting line is subsequently removed by a cutting and/or buffing finishing process. The "flow front" of such golf ball covers correspond to the location of the parting line.

Similarly, when an ionomer cover is formed using an injection molding process, the ionomer cover blend is injected into the mold halves through a plurality of injection gates and flows about the core to form a cover. As such, there are a number of areas or "flow fronts" throughout the cover wherein the cover blend injected through the various gates flows together.

As mentioned above, it is generally recognized in the golf ball industry that the occurrence of flow front failures is not the result of random flaws or imperfections along the seam of the ball, but instead is an indicator of a larger problem in the manufacturing process. In particular, the occurrence of flow front failures is normally interpreted as indicating a problem with the compatibility and/or incomplete mixing of the various components of the cover blend.

Additionally, golf ball covers formed from components exhibiting compatibility problems also often exhibit delamination. Normal golf ball cover layers comprise a single, essentially homogeneous layer of the cover material. However, as used herein, "delamination" refers to a condition wherein the cover exhibits stratification of the cover material into layers within the cover layer itself and these various layers "onion-skin" or peel off. Such delamination can typically be observed visually and can be confirmed through a simple manual test wherein a knife blade is used to "peel" the cover, exposing the stratification of the cover material.

Further, covers wherein the cover blend components are incompatible will also often exhibit a phenomena referred to as "swirling", wherein the cover layer of the golf ball exhibits non-uniform coloration such that the cover exhibits swirls or whirls of different shades of the base color. Such non-uniform coloration is readily apparent upon visual inspection of the ball.

By the present invention, it has been found that the relationship of the acid content of the base ionomer resin and the acid content of the carrier ionomer resin employed in the color concentrate has an impact on the final properties of the golf ball covers formed therefrom. In particular, by the present invention, it is believed that delamination, swirling and/or seam failures can be avoided or prevented by employing a base ionomer resin and a carrier ionomer resin having acid contents within a specific relationship.

Specifically, the covers employed in the present invention are formed from blends which comprise a base ionomer resin having an acid content by weight percent (X), wherein X is at least about 15% by weight, and a color concentrate formed from a carrier ionomer resin having an acid content by weight percent (Y) such that X–Y≦4, preferably X–Y≦3 and more preferably X–Y≦2. Most preferably, the acid content of the base ionomer resin (X) and acid content of the carrier ionomer resin (Y) are substantially the same.

Without being limiting to any single theory, it is believed that flow front failure, delamination and/or swirling occur in ionomer covers as a result of an incompatibility of the base ionomer resin and the carrier ionomer resin employed in such blends. It is desirable that polymers employed in a blend be miscible and form a homogeneous blend on a microscopic scale that consists of a single, continuous phase. However, when incompatible polymers are mixed, separate and discrete phases are formed resulting in a blend which is heterogeneous on a macroscopic, as well as a microscopic level, much in the same manner as a mixture of oil and water. Golf balls formed from cover blends of materials that are incompatible would be expected to lack durability, exhibit flow front failures after relatively few hits, as well as exhibit delamination and/or swirling as described above.

With regard to blends of ionomers, it is believed that the acid content of the ionomers has a bearing on the compatibility of the constituent ionomers. Specifically, it is believed that if the difference in acid content of the ionomers is too great, the ionic concentration of the ionomers will be too different, resulting in a decrease in the compatibility/miscibility of the ionomers and providing a heterogenous cover blend having discrete phases of ionomers within the cover. Such discrete phases are believed to lead to flow front failures, delamination and/or swirling.

However, as discussed above, it has been discovered that if the acid content of the base ionomer resin (X), wherein X is at least about 15% by weight, and the acid content of the carrier ionomer resin (Y) is "matched" such that X–Y≦4, preferably X–Y≦3 and more preferably X–Y≦2, and most preferably X and Y are substantially the same, the ionomers will be compatible and provide a relatively homogenous cover blend, thereby avoiding or preventing flow front failures, as well as delamination and/or swirling of the cover. It is to be understood that "X" corresponds to the acid content of a single base ionomer resin or the average of the acid content of two or more ionomer resins if the base ionomer resin is formed from more than one ionomer resin (e.g., a 50/50 blend of a 19% acid ionomer/15% acid ionomer).

Furthermore, it is also believed that the extent of neutralization of the acid moieties of the base ionomer resin and the carrier ionomer resin also impact the compatibility of these resins. Accordingly, it is desirable that the base ionomer resin and the carrier ionomer resin have substantially the same percentage of their acid moieties neutralized by metal cations.

The cover blends employed in the present invention comprise 99 to about 90% by weight of at least one base ionomer resin and 1 to about 10% by weight color concentrate;

preferably 98 to about 93% by weight of at least one base ionomer resin and 2 to about 7% by weight color concentrate; and more preferably 96 to about 94% by weight of at least one base ionomer resin and 4 to about 6% by weight color concentrate.

The color concentrate comprises about 20 to about 60% by weight coloring agent and about 80 to about 40% by weight of at least one carrier ionomer resin; preferably about 30 to about 50% by weight coloring agent and about 70 to about 50% by weight of at least one carrier ionomer resin and more preferably about 40 to about 45% by weight coloring agent and about 60 to about 55% by weight of at least one carrier ionomer resin. Preferably, the coloring agent comprises $TiO_2$.

As mentioned above, ionomers comprise copolymers of ethylene and acrylic and/or methacrylic acid. The acid content (X) of the base ionomer resin or the average acid content of a blend of more than one base ionomer resins employed in the cover compositions of the present invention ranges from about 15% to about 25%, preferably 15% to 20% and more preferably from 17% to 19%. The carrier ionomer resin is selected to have an acid content (Y) such that $X-Y \leq 4$; preferably $X-Y \leq 3$, more preferably $X-Y \leq 2$ and most preferably X and Y are substantially the same.

The following examples of golf balls having cover layers formed in accordance with the present invention are given to illustrate the present invention. However, it is to be understood that the examples are for illustrative purposes only and in no manner is the present invention limited to the specific disclosures therein.

EXAMPLE 1

Two batches of two-piece golf balls were made using conventional manufacturing methods. These golf balls were formed from a cross-linked polybutadiene core and ionomer blend cover. The ionomer cover blend comprised 95 phr of a base ionomer resin comprising of a 50/50 blend of a copolymer of ethylene and about 15% methacrylic acid partially neutralized with Li and a copolymer of ethylene and about 19% methacrylic acid partially neutralized with Na and 5 phr of a color concentrate comprising about 40% by weight $TiO_2$ and about 60% by weight carrier ionomer resin. The acid content of the base ionomer resin (X) was about 17% (i.e. a 50/50 blend of 15% and 19% acid ionomers).

One batch of the golf balls was formed using a copolymer of ethylene and about 10% methacrylic acid partially neutralized with Na as the carrier ionomer resin for the color concentrate. The other batch was formed using a copolymer of ethylene and about 15% methacrylic acid partially neutralized with Na as the carrier ionomer resin for the $TiO_2$ concentrate. Thus, the acid content of the carrier ionomer resins (Y) employed in these examples was about 10% or about 15%, respectively. The base ionomer and color concentrate were blended in a blending tote and subsequently mixed in a ribbon blender.

A dozen balls from each batch were tested for durability using the following test procedure. Durability was determined by using a hitting machine to hit a golf ball into a catching net, then automatically returning the ball into position where it is hit again. The test continues until the pre-set number of hits is reached, with 600 hits being the maximum or until the golf ball fails, as judged by visual observations.

In particular, the balls were evaluated after every 50 hits to determine if any of the balls exhibited a failure and what the mode of failure was, i.e. a flow front failure or a random failure. The testing cycle continued until at least 50% of the balls failed. The results of the durability tested are reported below in Table I.

TABLE I

Effect of Acid Level In Color Concentrate Carrier Resin On Mode Of Failure In Durability Test For Two-Piece Golf Balls

| Carrier Ionomer Resin | Number and Mode of Failure (per number of hits) | | | | | | | | | | |
| --- | --- | --- | --- | --- | --- | --- | --- | --- | --- | --- | --- |
| | 50x | 100x | 150x | 200x | 250x | 300x | 350x | 400x | 450x | 500x | 550x |
| Copolymer of ethylene - 10% methacrylic acid partially neutralized with Na | 0 | 0 | 0 | 0 | 0 | 1F | 0 | 0 | 0 | 1F | 2R, 3F |
| Copolymer of ethylene - 15% methacrylic acid partially neutralized with Na | 0 | 0 | 0 | 0 | 0 | 0 | 0 | 1R | 1R | 3R | 5R |

"R" denotes a Random Failure mode.
"F" denotes a Flow Front Failure mode.

As illustrated in Table I, the golf balls having a cover formed with the copolymer of ethylene/10% methacrylic acid partially neutralized with Na as the carrier ionomer resin exhibited a total of 5 flow front failures (the first occurring after 300 hits, 1 more after 500 hits and 3 more after 550 hits) and 2 random failures (occurring after 550 hits). In comparison, the golf balls having a cover formed the copolymer of ethylene/15% methacrylic acid partially neutralized with Na as the carrier ionomer resin did not exhibit any flow front failures at all and did not even exhibit a random front failure until 400 hits.

Further, substantially all of the golf balls made with the cover blend having color concentrates formed with a 10% acid carrier ionomer resin exhibited delamination, while none of the golf balls made with the cover blend having color concentrates formed with a 15% acid carrier ionomer resins exhibited delamination.

Thus, when the acid content of the base ionomer resin blend (X) was 17% and the acid content of the carrier ionomer resin (Y) was 15% such that X−Y≦4 (i.e. 17−15=2), the golf balls withstood a greater number of hits until the first failure of any kind, as well as a greater number of hits until the first flow front failure as compared to the golf balls having a carrier ionomer with an acid content (Y) such that the relationship X−Y≦4 was not met (17−10=7). Likewise, the golf balls meeting the above relationship also exhibited far fewer total flow front failures and did not exhibit any delamination.

EXAMPLE 2

Two batches of multilayer golf balls were made from a cross-linked polybutadiene core, an ionomer cover blend and a Hytrel® intermediate layer interposed between the cover and the core. The ionomer cover blend comprised 95 phr of a base ionomer resin comprising a 50/50 blend of a copolymer of ethylene and 15% methacrylic acid partially neutralized with Li and a copolymer of ethylene and 19% methacrylic acid partially neutralized with Na and 5 phr of a color concentrate comprising about 40% by weight $TiO_2$ and 60% by weight carrier ionomer resin. The intermediate layer was formed from Hytrel® 3078 filled with 20 wt. % ZnO. The acid content of the base ionomer resin (X) was about 17% (i.e. a 50/50 blend of 15% acid ionomer and 19% acid ionomer).

One batch of the golf balls was formed using a copolymer of ethylene and 10% methacrylic acid partially neutralized with Na as the carrier ionomer resin for the color concentrate. The other batch was formed using a copolymer of ethylene and 15% methacrylic acid partially neutralized with Na as the carrier ionomer resin for the color concentrate. Thus, the acid content of the carrier ionomer resins (Y) employed in the color concentrates were 10% and 15%, respectively.

A dozen balls from each batch were tested for durability using the same test procedure employed in Example 1. The results of the durability tested are reported below in Table II.

TABLE II

Effect of Acid Level In Color Concentrate Carrier Resin On Mode Of Failure In Durability Test For Multilayer Golf Balls

| Carrier Ionomer Resin | Number and Mode of Failure (per number of hits) | | | | | | | |
|---|---|---|---|---|---|---|---|---|
| | 50x | 100x | 150X | 200x | 250x | 300x | 350x | 400x |
| Copolymer of ethylene - 10% methacrylic acid partially neutralized with Na | 0 | 0 | 0 | 1F | 0 | 0 | 4F | 2R, 1F |
| Copolymer of ethylene - 15% methacrylic acid partially neutralized with Na | 0 | 0 | 0 | 0 | 0 | 1R | 4R, 1F | — |

"R" denotes a Random Failure mode.
"F" denotes a Flow Front Failure mode.

As illustrated in Table II, the golf balls having a cover formed with the copolymer of ethylene-10% methacrylic acid partially neutralized with Na as the carrier ionomer resin exhibited a total of 6 flow front failures, the first of which occurred after only 200 hits. In comparison, the golf balls having a cover formed with the copolymer of ethylene-15% methacrylic acid partially neutralized with Na as the carrier ionomer resin did not exhibit any failures at all until 300 hits and exhibited only a single flow front failure at 350 hits.

As in Example 1, when the acid content of the base ionomer resin (X) was 17% and the acid content of the carrier ionomer resin (Y) was 15% such that X−Y≦4 (i.e. 17−15=2), the golf balls exhibited a greater number of hits until the first failure of any kind, as well as a greater number of hits until the first flow front failure as compared to the golf balls having a carrier ionomer with an acid content (Y) such that the relationship X−Y≦4 was not met (17−10=7). Likewise, the golf balls meeting the above relationship also exhibited far fewer total flow front failures.

While it is apparent that the illustrative embodiments of the invention herein discloses fulfills the objective stated above, it will be appreciated that numerous modifications and other embodiments may be devised by those skilled in the art. Therefore, it will be understood that the appended claims are intended to cover all such modifications and embodiments which come with the spirit and scope of the present invention.

We claim:

1. A golf ball comprising a cover and a core, wherein said cover is formed from a cover composition comprising:
   (a) at least one base ionomer resin having a methacrylic acid content (X), wherein (X) is at least about 15 percent and wherein the methacrylic acid content is partially neutralized with a first component selected from the group consisting of sodium and lithium; and
   (b) a color concentrate composition which comprises a coloring agent and at least one carrier ionomer resin having an acid content (Y); wherein the acid content of (Y) is partially neutralized with a second component selected from the group consisting of sodium and lithium, and wherein the relationship of the acid content of the base ionomer resin (X) and the acid content of the carrier ionomer resin (Y) is X-Y≦4%, based on the weight % of the ionomer resin, and wherein the first component is different from the second component, provided that each ionomer resin in the cover composition is neutralized with lithium, sodium, or a combination thereof.

2. The golf ball of claim 1, wherein the relationship between the acid content of the base ionomer resin (X) and the acid content of the carrier ionomer resin (Y) is X-Y≦2%, based on the weight percent of the ionomer resin.

3. The golf ball of claim 1, wherein the acid content of the base ionomer resin (X) and the acid content of the carrier ionomer resin (Y) are substantially the same.

4. The golf ball of claim 1, wherein the base ionomer resin has an acid content (X) of between about 15 to about 25%, by weight of the ionomer resin.

5. The golf ball of claim 1, wherein the base ionomer resin has an acid content (X) of between about 15 to about 19%, by weight of the ionomer resin.

6. The golf ball of claim 1, wherein the base ionomer resin has an acid content (X) of between about 17 to about 19%, by weight of the ionomer resin.

7. The golf ball of claim 1, wherein the color concentrate composition comprises about 20–50% coloring agent, by weight of the composition, and about 80–50% carrier ionomer resin.

8. The golf ball of claim 1, wherein said coloring agent comprises $TiO_2$.

9. The golf ball of claim 1, wherein said base resin comprises at least two ionomer resins.

10. The golf ball of claim 1, wherein said cover composition comprises about 90 to about 99% by weight base ionomer resin and about 1 to about 10% by weight color concentrate.

11. The golf ball of claim 1, wherein the base ionomer resin is present in an amount from 99 to about 90% by weight and the color concentrate is present in an amount from 1 to about 10% by weight, based on the total ionomer content.

12. The golf ball of claim 17, wherein the base ionomer resin is present in an amount from 96 to about 94% by weight and the color concentrate is present in an amount from 4 to about 6% by weight, based on the total ionomer content.

13. The golf ball of claim 1, wherein the color concentrate comprises about 20 to about 60% by weight coloring agent and about 80 to about 40% by weight of at least one carrier ionomer resin.

14. The golf ball of claim 13, wherein the color concentrate comprises about 40 to about 45% by weight coloring agent and about 60 to about 55% by weight of at least one carrier ionomer resin.

15. A method of forming a golf ball comprising the steps of:

(a) selecting a base ionomer resin having an acid content (X) of about 15 to about 25% by weight of the ionomer resin and wherein the methacrylic acid content is partially neutralized with a first component selected from the group consisting of sodium and lithium;

(b) selecting a carrier ionomer resin having a methacrylic acid content (Y) wherein the acid content of (Y) is partially neutralized with a second component selected from the group consisting of sodium and lithium, and such that X-Y≦4 and the first component is different from the second component;

(c) forming a color concentrate from a coloring agent and the carrier ionomer resin;

(d) forming a cover composition blend from the base ionomer resin and the carrier ionomer resin; and (e) applying said cover composition blend to the outer surface of a golf ball core to form a cover, provided that each ionomer resin in the cover composition is neutralized with lithium, sodium, or a combination thereof.

16. the method of claim 11, which further comprises:

(a) forming a plurality of pellets from the color concentrate;

(b) forming a plurality of pellets from the base ionomer resin; and (c) mixing the pellets formed from the color concentrate and the pellets formed from the base ionomer resin to form an admixture; and (d) heating the admixture to form the cover composition blend.

17. The method of claim 15, wherein the base ionomer resin is selected to have an acid content (X) of about 15% to about 19% by weight of the ionomer resin.

18. The method of claim 15, wherein the base ionomer resin and the carrier ionomer resin are selected such that X-Y≦2.

19. The method of claim 15, wherein the base ionomer resin and the carrier ionomer resin are selected to have substantially the same percent by weight acid content.

20. The method of claim 15, wherein titanium dioxide is selected as the coloring agent.

* * * * *